US012762795B2

(12) United States Patent
Meléndez et al.

(10) Patent No.: US 12,762,795 B2
(45) Date of Patent: Oct. 13, 2026

(54) COMPUTER VISION SYSTEMS AND METHODS FOR SUPPLYING MISSING POINT DATA IN POINT CLOUDS DERIVED FROM STEREOSCOPIC IMAGE PAIRS

(71) Applicant: Insurance Services Office, Inc., Jersey City, NJ (US)

(72) Inventors: Ángel Guijarro Meléndez, Getafe (ES); Ismael Aguilera Martin de Los Santos, Coslada (ES); Jose David Aguilera, Matthews, NC (US)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

(21) Appl. No.: 17/675,750

(22) Filed: Feb. 18, 2022

(65) Prior Publication Data

US 2022/0270323 A1 Aug. 25, 2022

Related U.S. Application Data

(60) Provisional application No. 63/151,392, filed on Feb. 19, 2021.

(51) Int. Cl.
*G06T 17/05* (2011.01)
*G06T 1/60* (2006.01)
(Continued)

(52) U.S. Cl.
CPC ................ *G06T 17/05* (2013.01); *G06T 1/60* (2013.01); *G06T 7/593* (2017.01); *G06V 10/22* (2022.01);
(Continued)

(58) Field of Classification Search
CPC ........... G06T 7/593; G06T 2207/10012; G06T 2207/10028; G06T 2207/20228;
(Continued)

(56) References Cited

U.S. PATENT DOCUMENTS 10,298,904 B1 5/2019 Dolgoff
2002/0076121 A1 * 6/2002 Shimizu .................. G06T 3/403
382/300

(Continued)

FOREIGN PATENT DOCUMENTS

CN 102938844 B 9/2015
CN 110021043 A * 7/2019

(Continued)

OTHER PUBLICATIONS

International Search Report of the International Searching Authority mailed on Jun. 10, 2022, issued in connection with International Application No. PCT/US2022/17044 (3 pages).

(Continued)

*Primary Examiner* — Weiming He
(74) *Attorney, Agent, or Firm* — McCarter & English, LLP

(57) ABSTRACT

Computer vision systems and methods for supplying missing point data in point clouds derived from stereoscopic image pairs are provided. The system retrieves the at least one stereoscopic image pair from the memory based on a received geospatial region of interest, and processes the at least one stereoscopic image pair to generate a disparity map from the at least one stereoscopic image pair. The system then processes the disparity map to generate a depth map from the disparity map. The depth map is then processed to generate a point cloud from the depth map, such that the point cloud lacks any missing point data. Finally, the point cloud is stored for future use.

38 Claims, 14 Drawing Sheets

(51) Int. Cl.

| | |
|---|---|
| ***G06T 7/593*** | (2017.01) |
| ***G06V 10/22*** | (2022.01) |
| ***G06V 10/25*** | (2022.01) |
| ***G06V 10/32*** | (2022.01) |
| ***G06V 10/75*** | (2022.01) |
| ***H04N 13/111*** | (2018.01) |
| ***H04N 13/128*** | (2018.01) |
| *H04N 13/00* | (2018.01) |

(52) U.S. Cl.
CPC .............. *G06V 10/25* (2022.01); *G06V 10/32* (2022.01); *G06V 10/751* (2022.01); *H04N 13/111* (2018.05); *H04N 13/128* (2018.05); *G06T 2200/08* (2013.01); *G06T 2207/10012* (2013.01); *G06T 2207/10032* (2013.01); *G06T 2207/20228* (2013.01); *G06T 2207/30181* (2013.01); *H04N 2013/0081* (2013.01)

(58) Field of Classification Search
CPC ....... G06T 17/00; G06T 17/05; G06T 3/4007; G06T 5/50; G06T 2207/20221; H04N 13/111; H04N 13/128; H04N 2013/0081; H04N 13/271; G06V 10/75; G06V 10/25; G06V 10/32; G06F 18/22

See application file for complete search history.

(56) References Cited

U.S. PATENT DOCUMENTS

| | | | | |
|---|---|---|---|---|
| 2014/0132601 | A1 | 5/2014 | Raghoebardayal et al. | |
| 2016/0005228 | A1* | 1/2016 | Niebla, Jr. | H04N 13/261 348/43 |
| 2017/0085863 | A1 | 3/2017 | Lopez et al. | |
| 2017/0257562 | A1* | 9/2017 | Venkataraman | G06T 7/50 |
| 2017/0302910 | A1* | 10/2017 | Richards | H04N 13/243 |
| 2019/0094875 | A1 | 3/2019 | Schulter et al. | |
| 2019/0333237 | A1* | 10/2019 | Javidnia | G06T 7/593 |
| 2020/0302627 | A1* | 9/2020 | Duggal | G06N 20/00 |

FOREIGN PATENT DOCUMENTS

| | | | | |
|---|---|---|---|---|
| CN | 111198563 A * | 5/2020 | | G05D 1/0221 |
| EP | 3304500 B1 | 5/2020 | | |

OTHER PUBLICATIONS

Written Opinion of the International Searching Authority mailed on Jun. 10, 2022, issued in connection with International Application No. PCT/US2022/17044 (8 pages).
Ruano, et al., “Aerial Video Geo-Registration Using Terrain Models from Dense and Coherent Stereo Matching,” Proc. of SPIE (2014) (10 pages).
Extended European Search Report dated Dec. 4, 2024, issued in connection with European Patent Application No. 22757026.14 (12 pages).

* cited by examiner

80

```
Let PBTerrain(PA) = ProjectionOntoImageB(PA, TerrainZ)
Let PBCandidates(PA) = set of pixels that forms to epipolar line
Let PixelMatchingConfidence(PA,PB) = someFunctionA(PA,PB)
Let BestPixelMatchingInB(PA) = PB where PixelMatchingConfidence(PA,PB) is maximum for every value of PBCandidates(PA)
if PixelMatchingConfidence(PA,BestPixelMatchingInB(PA)) > threshold, then
        DisparityMap(PA) = distance between BestPixelMatchingInB(PA) and PBTerrain(PA)
else
        DisparityMap(PA) = NULL where NULL is a value different from 0 - zero-
end
```

FIG. 5

90

| PA=(PAx, PAy) | PBTerrain(PA) | PBCandidate(PA) | PixelMatchingConfidence (PA,PBCandidate(PA)) | Pixel Matching Confidence Threshold = 0.50 |
|---|---|---|---|---|
| 10,10 | 349.44, 567.11 | 345.24, 563.21 | 0.00 | |
| | | 345.94, 563.86 | 0.01 | |
| | | 346.64, 564.51 | 0.13 | |
| | | 347.34, 565.16 | 0.45 | |
| | | 348.04, 565.81 | 0.88 (maximum value, higher than threshold) | ← BestPixelMatchingConfidence(10,10)= (348.04,565.81) |
| | | | | DisparityMap(10,10) = hypot(348.04 - 349.44, 565.81- 567.11) = 1.91 |
| | | 348.74, 566.46 | 0.50 | |
| | | 349.44,567.11 | 0.10 | |
| | | 350.14, 567.76 | 0.08 | |
| | | 350.84, 568.41 | 0.00 | |
| 10,11 | 346.54, 564.26 | 345.84, 563.61 | 0.01 | |
| | | 346.54, 564.26 | 0.02 | |
| | | 347.24, 564.91 | 0.41 (maximum value, lower than threshold) | ← BestPixelMatchingConfidence(10,11)= (347.24, 564.91) |
| | | | | DisparityMap(10,11) = Null |
| | | 347.94, 565.56 | 0.32 | |
| | | 348.64, 566.21 | 0.12 | |
| | | 349.34, 566.86 | 0.08 | |
| | | 350.04, 567.51 | 0.06 | |
| | | 350.74, 568.16 | 0.24 | |
| | | 351.44, 568.81 | 0.43 | |

FIG. 6

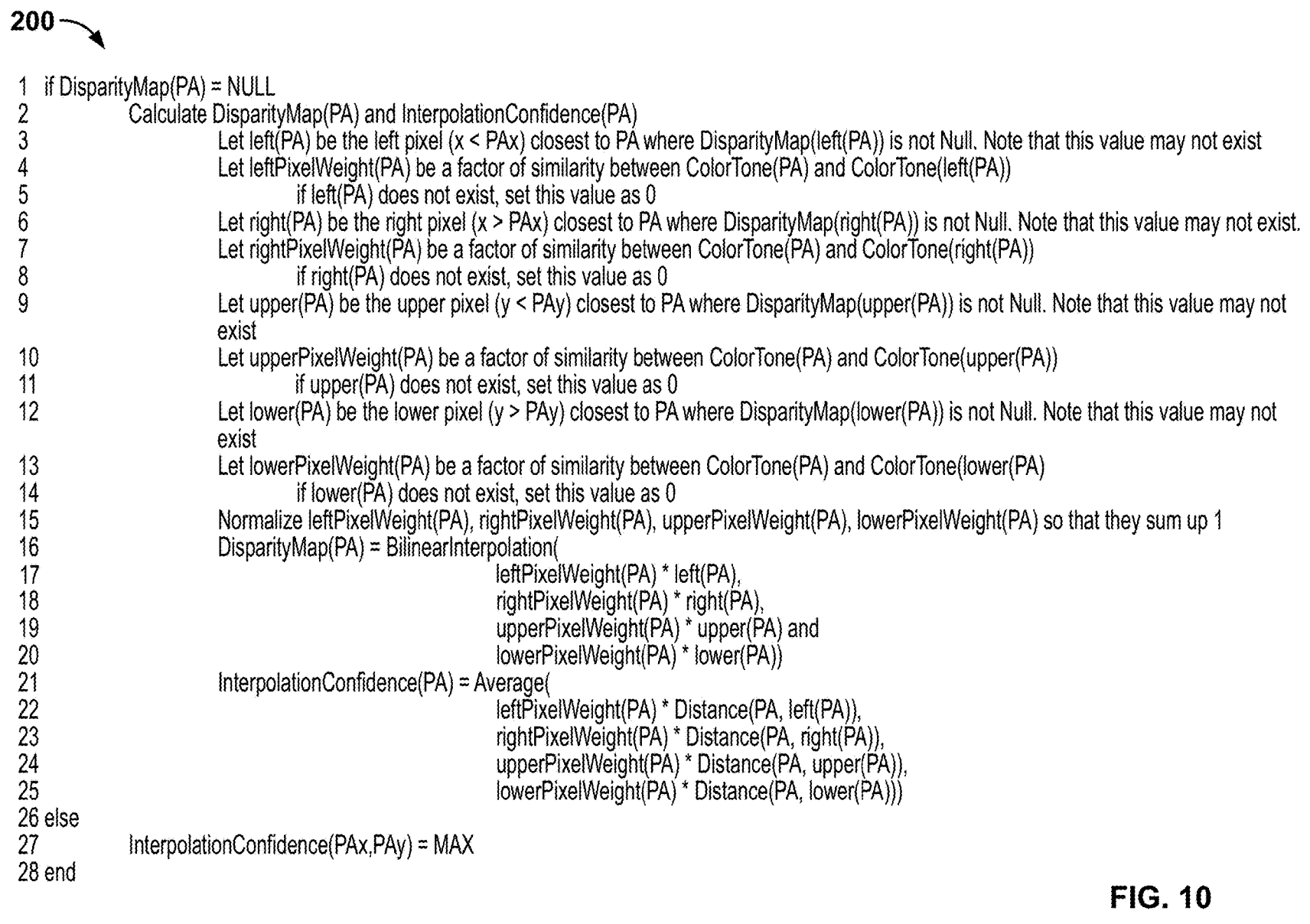

200

```
if DisparityMap(PA) = NULL
    Calculate DisparityMap(PA) and InterpolationConfidence(PA)
        Let left(PA) be the left pixel (x < PAx) closest to PA where DisparityMap(left(PA)) is not Null. Note that this value may not exist
        Let leftPixelWeight(PA) be a factor of similarity between ColorTone(PA) and ColorTone(left(PA))
            if left(PA) does not exist, set this value as 0
        Let right(PA) be the right pixel (x > PAx) closest to PA where DisparityMap(right(PA)) is not Null. Note that this value may not exist.
        Let rightPixelWeight(PA) be a factor of similarity between ColorTone(PA) and ColorTone(right(PA))
            if right(PA) does not exist, set this value as 0
        Let upper(PA) be the upper pixel (y < PAy) closest to PA where DisparityMap(upper(PA)) is not Null. Note that this value may not
        exist
        Let upperPixelWeight(PA) be a factor of similarity between ColorTone(PA) and ColorTone(upper(PA))
            if upper(PA) does not exist, set this value as 0
        Let lower(PA) be the lower pixel (y > PAy) closest to PA where DisparityMap(lower(PA)) is not Null. Note that this value may not
        exist
        Let lowerPixelWeight(PA) be a factor of similarity between ColorTone(PA) and ColorTone(lower(PA)
            if lower(PA) does not exist, set this value as 0
        Normalize leftPixelWeight(PA), rightPixelWeight(PA), upperPixelWeight(PA), lowerPixelWeight(PA) so that they sum up 1
        DisparityMap(PA) = BilinearInterpolation(
                        leftPixelWeight(PA) * left(PA),
                        rightPixelWeight(PA) * right(PA),
                        upperPixelWeight(PA) * upper(PA) and
                        lowerPixelWeight(PA) * lower(PA))
        InterpolationConfidence(PA) = Average(
                        leftPixelWeight(PA) * Distance(PA, left(PA)),
                        rightPixelWeight(PA) * Distance(PA, right(PA)),
                        upperPixelWeight(PA) * Distance(PA, upper(PA)),
                        lowerPixelWeight(PA) * Distance(PA, lower(PA)))
else
    InterpolationConfidence(PAx,PAy) = MAX
end
```

FIG. 10

COMPUTER VISION SYSTEMS AND METHODS FOR SUPPLYING MISSING POINT DATA IN POINT CLOUDS DERIVED FROM STEREOSCOPIC IMAGE PAIRS

RELATED APPLICATIONS

The present application claims the priority of U.S. Provisional Application Ser. No. 63/151,392 filed on Feb. 19, 2021, the entire disclosure of which is expressly incorporated herein by reference.

BACKGROUND

The present disclosure relates generally to the field of computer modeling of structures. More particularly, the present disclosure relates to computer vision systems and methods for supplying missing point data in point clouds derived from stereoscopic image pairs.

RELATED ART

Accurate and rapid identification and depiction of objects from digital images (e.g., aerial images, satellite images, etc.) is increasingly important for a variety of applications. For example, information related to various features of buildings, such as roofs, walls, doors, etc., is often used by construction professionals to specify materials and associated costs for both newly-constructed buildings, as well as for replacing and upgrading existing structures. Further, in the insurance industry, accurate information about structures may be used to determine the proper costs for insuring buildings/structures. Still further, government entities can use information about the known objects in a specified area for planning projects such as zoning, construction, parks and recreation, housing projects, etc.

Various software systems have been implemented to process aerial images to generate 3D models of structures present in the aerial images. However, these systems have drawbacks, such as missing point cloud data and an inability to accurately depict elevation, detect internal line segments, or to segment the models sufficiently for cost-accurate cost estimation. This may result in an inaccurate or an incomplete 3D model of the structure. As such, the ability to generate an accurate and complete 3D model from 2D images is a powerful tool.

Thus, what would be desirable is a system that automatically and efficiently processes digital images, regardless of the source, to automatically generate a model of a 3D structure present in the digital images. Accordingly, the computer vision systems and methods disclosed herein solve these and other needs.

SUMMARY

The present disclosure relates to computer vision systems and methods for supplying missing point data in point clouds derived from stereoscopic image pairs. The system retrieves the at least one stereoscopic image pair from the memory based on a received geospatial region of interest, and processes the at least one stereoscopic image pair to generate a disparity map from the at least one stereoscopic image pair. The system then processes the disparity map to generate a depth map from the disparity map. The depth map is then processed to generate a point cloud from the depth map, such that the point cloud lacks any missing point data. Finally, the point cloud is stored for future use.

BRIEF DESCRIPTION OF THE DRAWINGS

The foregoing features of the invention will be apparent from the following Detailed Description of the Invention, taken in connection with the accompanying drawings, in which:

FIG. 5 is a diagram illustrating a conventional algorithm for determining a disparity map;

FIG. 6 is a table illustrating values and processing results for determining the disparity map based on the algorithm of FIG. 5;

FIG. 10 is a diagram illustrating an algorithm for determining a disparity map by the system of the present disclosure;

DETAILED DESCRIPTION

The present disclosure relates to computer vision systems and methods for supplying missing point data in point clouds derived from stereoscopic image pairs, as described in detail below in connection with FIGS. 1-14.

Figure 1:
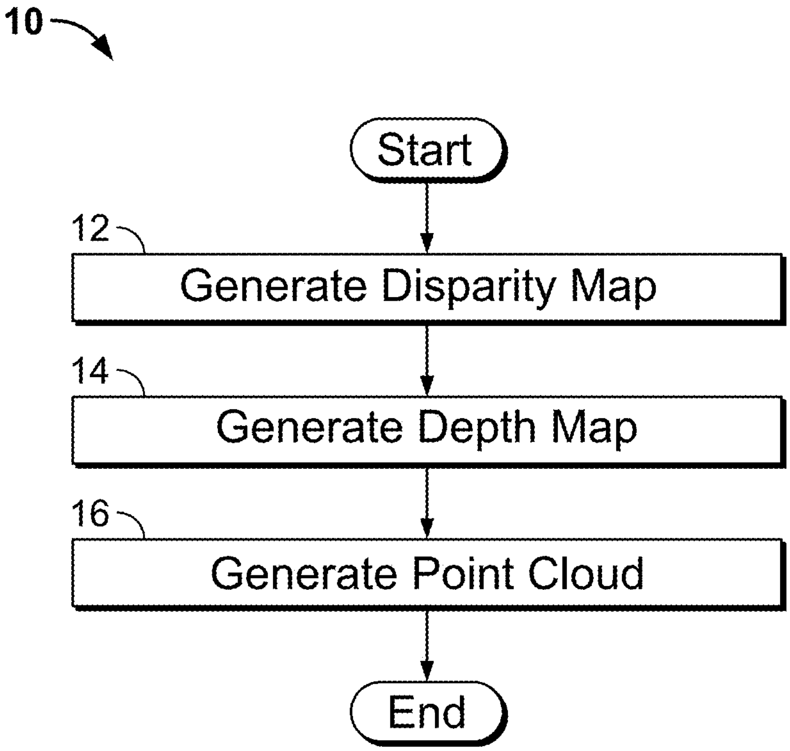
FIG. 1 is a flowchart illustrating conventional processing steps carried out by a system for generating a point cloud from a stereoscopic pair of images.

By way of background, FIG. 1 is a flowchart 10 illustrating processing steps carried out by the system for generating a point cloud from a stereoscopic image pair. In step 12, the system generates a disparity map which is described in greater detail below in relation to FIGS. 2 and 3.

Figure 2:
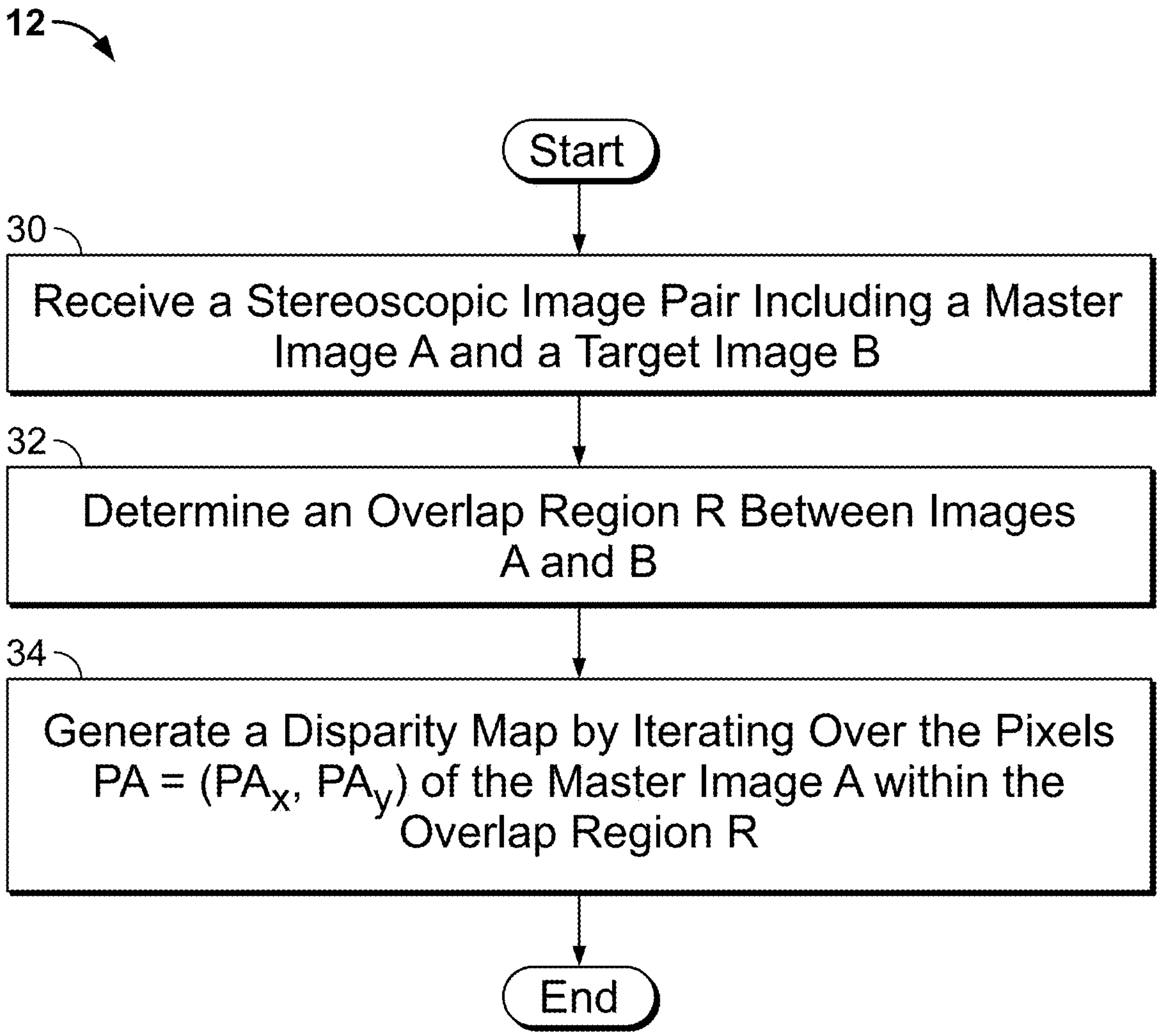
FIG. 2 is a flowchart illustrating step 12 of FIG. 1 in greater detail.

FIG. 2 is a flowchart illustrating step 12 of FIG. 1 in greater detail. In particular, FIG. 2 illustrates processing steps carried out by the system for generating a disparity map. In step 30, the system receives a stereoscopic image pair including a master image A and a target image B. In step 32, the system determines an overlap region R between image A and image B. Then, in step 34, the system generates a disparity map by iterating over pixels of image A (PA) within the overlap region R where a pixel PA is denoted by ($PA_x$, $PA_y$).

Figure 3:
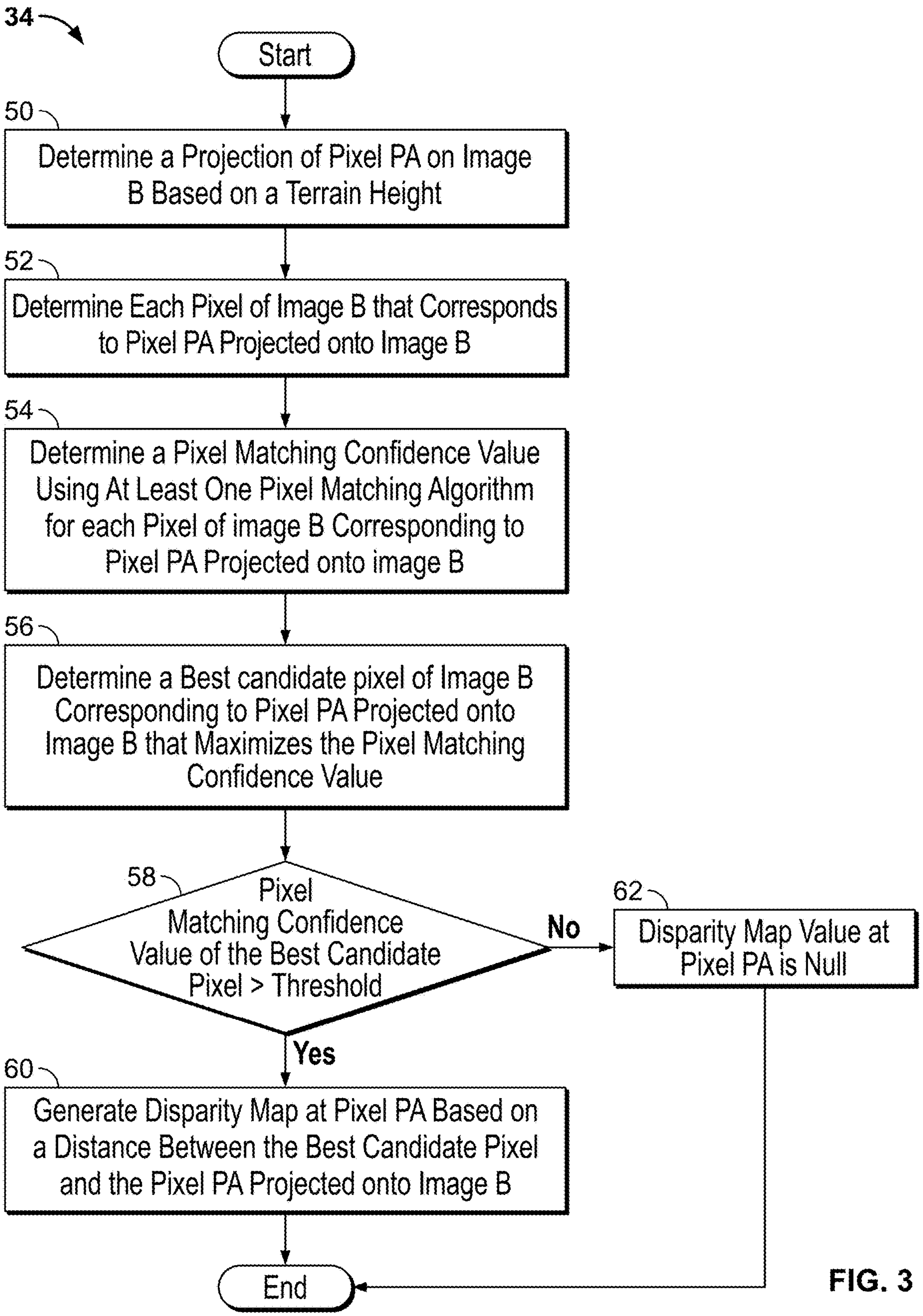
FIG. 3 is a flowchart illustrating step 34 of FIG. 2 in greater detail.

FIG. 3 is a flowchart illustrating step 34 of FIG. 2 in greater detail. In particular, FIG. 3 illustrates conventional processing steps carried out by the system for generating a disparity map by iterating over the pixels of image A within the overlap region R. In step 50, the system determines a projection of a pixel PA on the image B given a terrain height denoted by TerrainZ. The system determines the projection of the pixel PA on the image B by Equation 1 below:

$$PBTerrain(PA) = ProjectionOntoImageB(PA, TerrainZ) \quad \text{Equation 1}$$

In step 52, the system determines each pixel of image B (PB) that corresponds to the pixel PA projected onto image B denoted by PBCandidates(PA). In particular, the system determines a set of pixels PB that forms an epipolar line via Equation 2 below:

$$PBCandidates(PA) = \text{set of pixels that forms to epipolar line} \quad \text{Equation 2}$$

In step 54, the system determines a pixel matching confidence value, denoted by PixelMatchingConfidence(PA, PB), using at least one pixel matching algorithm for each pixel of image B corresponding to the pixel PA projected onto image B (PBCandidates(PA)) according to Equation 3 below:

$$PixelMatchingConfidence(PA, PB) = someFunctionA(PA, PB) \quad \text{Equation 3}$$

It should be understood that the pixel matching confidence value is a numerical value that denotes a similarity factor value between a region near the pixel PA of image A and a region near the pixel PB of image B. In step 56, the system determines a best candidate pixel of image B corresponding to the pixel PA projected onto image B, denoted by BestPixelMatchingInB(PA), that maximizes the pixel matching confidence value via Equation 4 below:

$$BestPixelMatchingInB(PA) = PB \quad \text{Equation 4}$$

where the PixelMatchingConfidence(PA, PB) is a maximum for every value of PBCandidates(PA).

In step 58, the system determines whether the maximum pixel matching confidence value of the best candidate pixel of image B is greater than a threshold. If the maximum pixel matching confidence value of the best candidate pixel of image B is greater than the threshold, then the system determines a disparity map value at the pixel PA as a distance between the best candidate pixel of image B and the pixel PA projected onto image B according to Equation 5 below:

$$\text{If } PixelMatchingConfidence(PA, BestPixelMatchingInB(PA)) > \text{threshold}: \quad \text{Equation 5}$$
$$DisparityMap(PA) = \text{distance between } BestPixelMatchingInB(PA) \text{ and } PBTerrain(PA)$$

Alternatively, if the maximum pixel matching confidence value of the best candidate pixel of image B is less than the threshold, then the system determines that the disparity map value at the pixel PA is null. It should be understood that null is a value different from zero. It should also be understood that if the maximum pixel matching confidence value of the best candidate pixel of image B is less than the threshold, then the system discards all matching point pairs between the image A and the image B as these point pairs can yield an incorrect disparity map value. Discarding these point pairs can result in missing point data (e.g., holes) in the disparity map. Accordingly and as described in further detail below, the system of the present disclosure addresses the case in which the disparity map value at the pixel PA is null by supplying missing point data.

Figure 4:
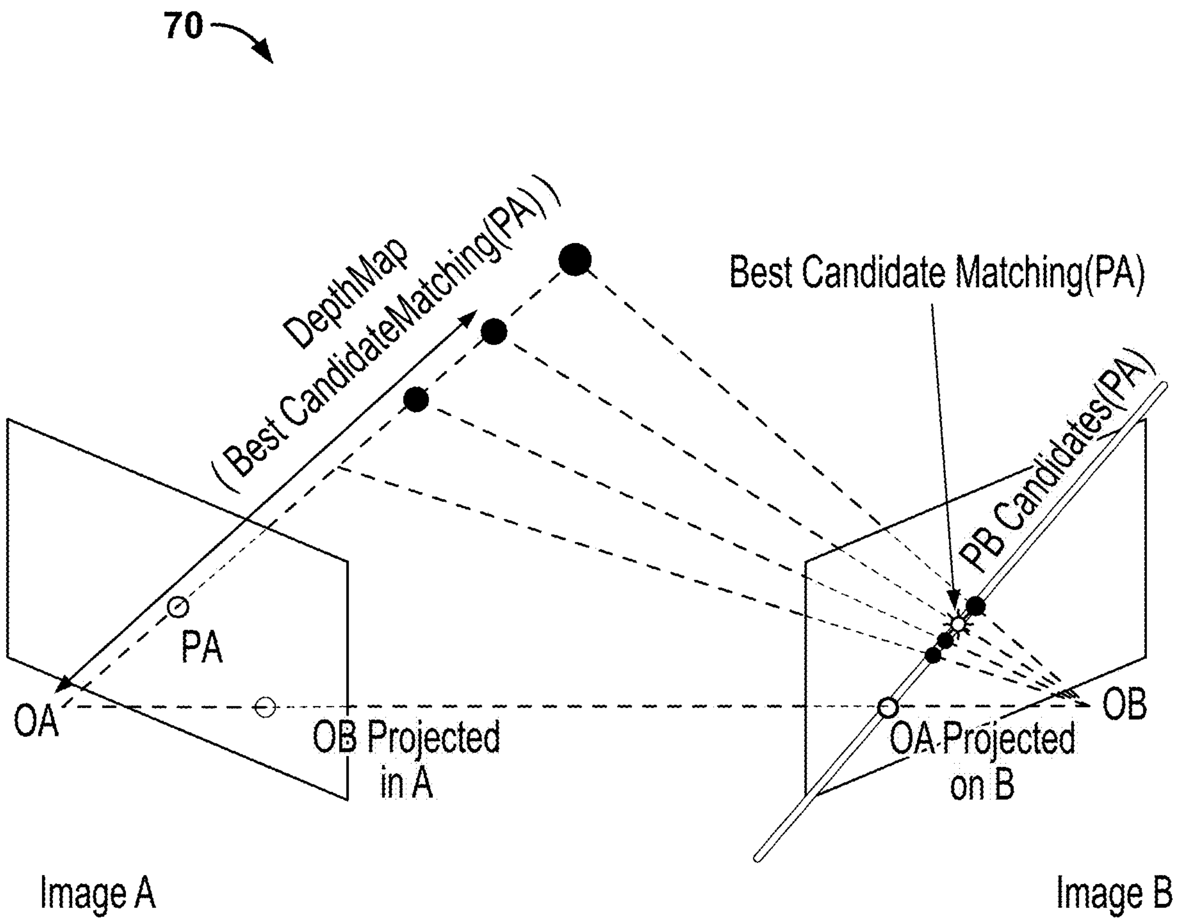
FIG. 4 is a diagram illustrating epipolar geometry between a stereoscopic pair of images.

FIG. 4 is a diagram 70 illustrating epipolar geometry between a stereoscopic image pair including images A and B for determining a disparity map as described above and a depth map as described in further detail below. FIG. 5 is a diagram 80 illustrating an algorithm for determining a disparity map. Additionally, FIG. 6 is a table 90 illustrating values and processing results for determining a disparity map based on the algorithm of FIG. 5. As shown in FIG. 6, for a pixel PA having coordinates (10, 10), a maximum pixel matching confidence value of the best candidate pixel of image B having coordinates (348.04, 565.81) is 0.88 which greater than a pixel matching confidence threshold of 0.50 such that the disparity map value at the pixel PA (10, 10) is 1.91. Alternatively, for a pixel PA having coordinates (10, 11), a maximum pixel matching confidence value of the best candidate pixel of image B having coordinates (347.24, 564.91) is 0.41 which is less than the pixel matching confidence threshold of 0.50 such that the disparity map value at the pixel PA (10, 11) is null.

Returning to FIG. 1, in step 14, the system generates a depth map. In particular, for each pixel PA of the disparity map, the system determines a depth map value at the pixel PA, denoted by DepthMap(PA), as a distance from the pixel PA to an image A camera projection center AO according to Equation 6 below:

$$DepthMap(PA) = someFunctionB(PA, DisparityMap(PA), \text{Image } A \text{ camera intrinsic parameters}) \quad \text{Equation 6}$$

It should be understood that Equation 6 requires image A camera intrinsic parameters including, but not limited to, focal distance, pixel size and distortion parameters. It should also be understood that the system can only determine the depth map value at the pixel PA if the disparity map value at the pixel PA is not null.

Lastly, in step 16, the system generates a point cloud. In particular, for each pixel PA of the depth map, the system determines a real three-dimensional (3D) geographic coordinate, denoted by RealXYZ(PA), according to Equation 7 below:

$$RealXYZ(PA_x, PA_y) = someFunctionC(PA, DepthMap(PA), \text{Image } A \text{ camera extrinisic parameters}) \quad \text{Equation 7}$$

It should be understood that Equation 7 requires the pixel PA, the DepthMap(PA), and image A camera extrinsic parameters such as the camera projection center AO and at least one camera positional angle (e.g., omega, phi, and kappa). It should also be understood that the system can only determine the real 3D geographic coordinate for a pixel PA of the depth map if the disparity map value at the pixel PA is not null. Accordingly, the aforementioned processing steps of FIGS. 1-3 yield a point cloud including a set of values returned by each real 3D geographic coordinate and associated color thereof, denoted by RGB(PA), for each pixel PA of the overlap region R where the disparity map value at each pixel PA is not null.

As mentioned above, when the disparity map value at the pixel PA is null (e.g., if the maximum pixel matching confidence value of the best candidate pixel of image B is less than a pixel matching confidence threshold), then the system discards all matching point pairs between the image A and the image B as these point pairs can yield an incorrect disparity map value. Discarding these point pairs can result in missing point data (e.g., holes) in the disparity map such that the point cloud generated therefrom is incomplete (e.g., the point cloud is sparse in some areas). Accordingly and as described in further detail below, the system of the present disclosure addresses the case in which the disparity map value at the pixel PA is null by supplying the disparity map with missing point data such that the point cloud generated therefrom is complete.

Figure 7:
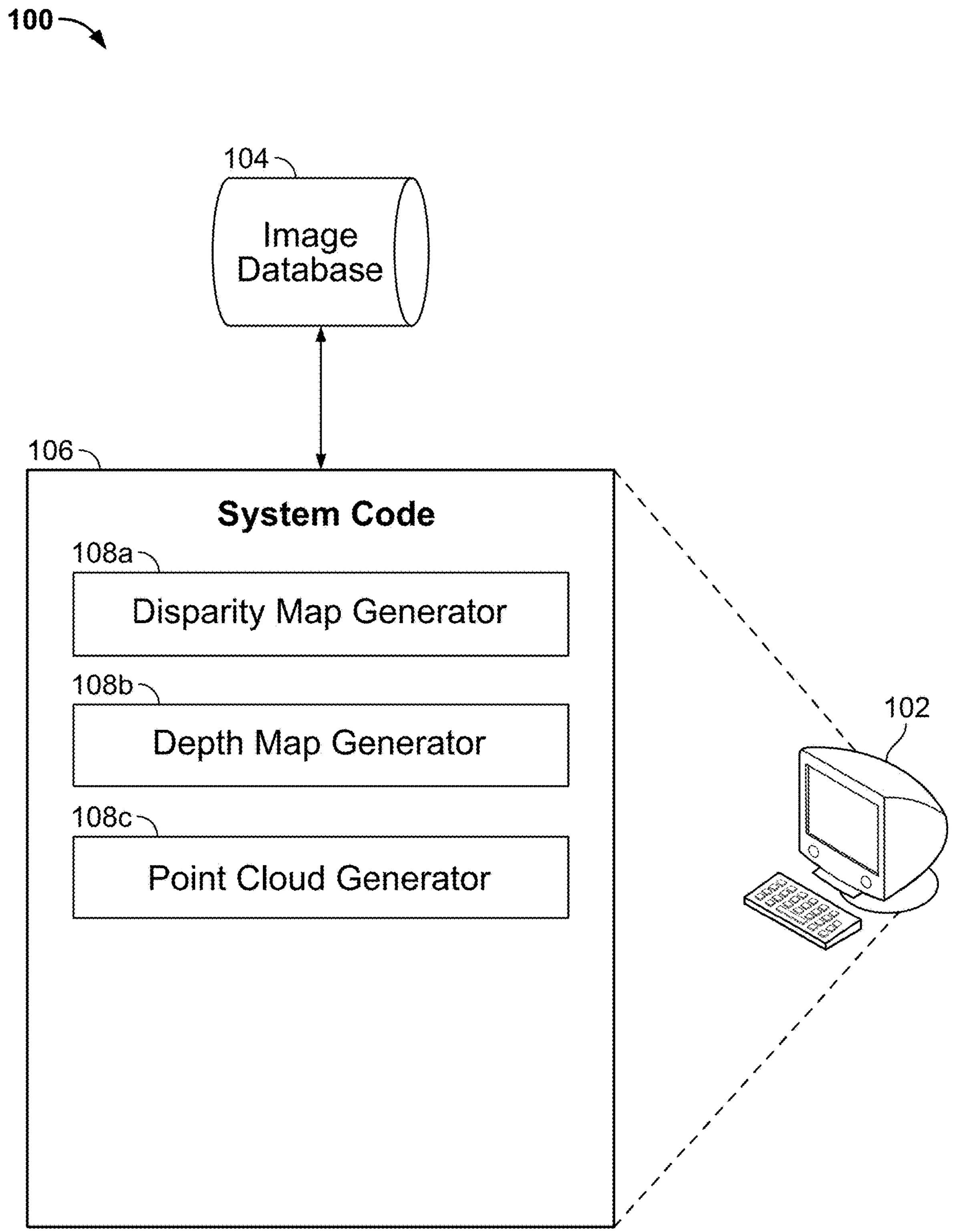
FIG. 7 is a diagram illustrating an embodiment of the system of the present disclosure.

FIG. 7 is a diagram illustrating an embodiment of the system 100 of the present disclosure. The system 100 could be embodied as a central processing unit 102 (e.g., a hardware processor) coupled to an image database 104. The hardware processor executes system code 106 which generates a 3D model of a structure based on a disparity map computed from a stereoscopic image pair, a depth map computed from the disparity map, and a 3D point cloud generated from the computed disparity and depth maps. The hardware processor could include, but is not limited to, a personal computer, a laptop computer, a tablet computer, a smart telephone, a server, and/or a cloud-based computing platform.

The image database 104 could include digital images and/or digital image datasets comprising aerial nadir and/or oblique images, unmanned aerial vehicle images or satellite images, etc. Further, the datasets could include, but are not limited to, images of rural, urban, residential and commercial areas. The image database 104 could store one or more 3D representations of an imaged location (including objects and/or structures at the location), such as 3D point clouds, LiDAR files, etc., and the system 100 could operate with such 3D representations. As such, by the terms "image" and "imagery" as used herein, it is meant not only optical imagery (including aerial and satellite imagery), but also 3D imagery and computer-generated imagery, including, but not limited to, LiDAR, point clouds, 3D images, etc.

The system 100 includes computer vision system code 106 (i.e., non-transitory, computer-readable instructions) stored on a computer-readable medium and executable by the hardware processor or one or more computer systems. The code 106 could include various custom-written software modules that carry out the steps/processes discussed herein, and could include, but is not limited to, a disparity map generator 108*a*, a depth map generator 108*b*, and a point cloud generator 108*c*. The code 106 could be programmed using any suitable programming languages including, but not limited to, C, C++, C#, Java, Python or any other suitable language. Additionally, the code 106 could be distributed across multiple computer systems in communication with each other over a communications network, and/or stored and executed on a cloud computing platform and remotely accessed by a computer system in communication with the cloud platform. The code 106 could communicate with the image database 104, which could be stored on the same computer system as the code 106, or on one or more other computer systems in communication with the code 106.

Still further, the system 100 could be embodied as a customized hardware component such as a field-programmable gate array (FPGA), application-specific integrated circuit (ASIC), embedded system, or other customized hardware component without departing from the spirit or scope of the present disclosure. It should be understood that FIG. 7 is only one potential configuration, and the system 100 of the present disclosure can be implemented using a number of different configurations.

Figure 8:
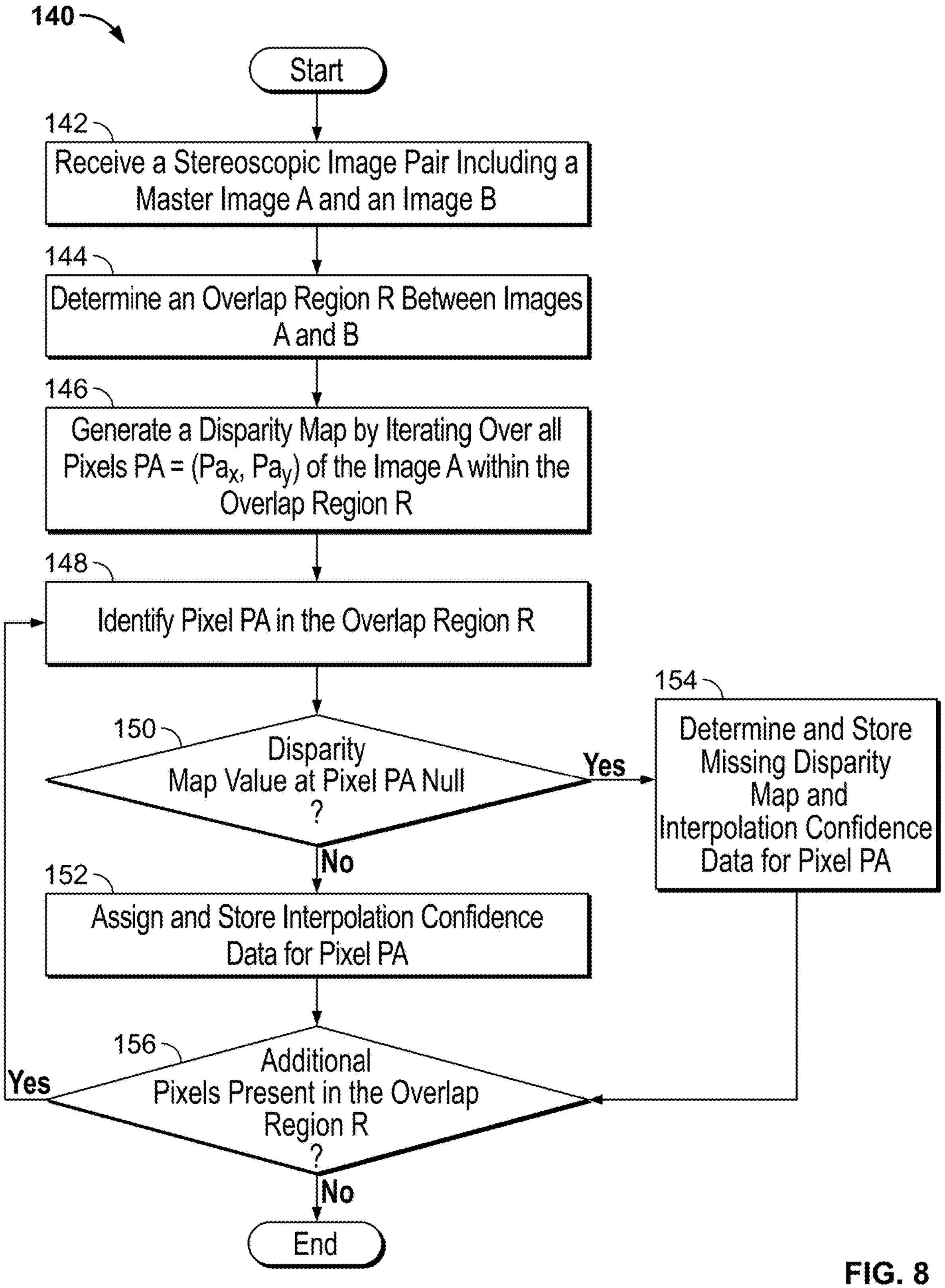
FIG. 8 is a flowchart illustrating overall processing steps carried out by the system of the present disclosure.

FIG. 8 is a flowchart illustrating overall processing steps carried out by the system 100 of the present disclosure. In step 142, the system 100 receives a stereoscopic image pair including a master image A and a target image B from the image database 104. In particular, the system 100 obtains two stereoscopic images and metadata thereof based on a geospatial region of interest (ROI) specified by a user. For example, a user can input latitude and longitude coordinates of an ROI. Alternatively, a user can input an address or a world point of an ROI. The geospatial ROI can be represented by a generic polygon enclosing a geocoding point indicative of the address or the world point. The region can be of interest to the user because of one or more structures present in the region. A property parcel included within the ROI can be selected based on the geocoding point and a deep learning neural network can be applied over the area of the parcel to detect a structure or a plurality of structures situated thereon.

The geospatial ROI can also be represented as a polygon bounded by latitude and longitude coordinates. In a first example, the bound can be a rectangle or any other shape centered on a postal address. In a second example, the bound can be determined from survey data of property parcel boundaries. In a third example, the bound can be determined from a selection of the user (e.g., in a geospatial mapping interface). Those skilled in the art would understand that other methods can be used to determine the bound of the polygon.

The ROI may be represented in any computer format, such as, for example, well-known text (WKT) data, TeX data, HTML, data, XML, data, etc. For example, a WKT polygon can comprise one or more computed independent world areas based on the detected structure in the parcel. After the user inputs the geospatial ROI, a stereoscopic image pair associated with the geospatial ROI is obtained from the image database 104. As mentioned above, the images can be digital images such as aerial images, satellite images, etc. However, those skilled in the art would understand that any type of image captured by any type of image capture source can be used. For example, the aerial images can be captured by image capture sources including, but not limited to, a plane, a helicopter, a paraglider, or an unmanned aerial vehicle. In addition, the images can be ground images captured by image capture sources including, but not limited to, a smartphone, a tablet or a digital camera. It should be understood that multiple images can overlap all or a portion of the geospatial ROI.

In step 144, the system 100 determines an overlap region R between the image A and the image B. Then, in step 146, the system 100 generates a disparity map by iterating over pixels of image A (PA) within the overlap region R where a pixel PA is denoted by ($PA_x$, $PA_y$). In step 148, the system 100 identifies a pixel PA in the overlap region R and, in step 150, the system 100 determines whether the disparity map value at the pixel PA is null. If the system 100 determines that the disparity map value at the pixel PA is not null, then the process proceeds to step 152. In step 152, the system 100 assigns and stores interpolation confidence data for the pixel PA denoted by InterpolationConfidence(PA). In particular, the system 100 assigns a specific value to the pixel PA indicating that this value is not tentative but instead extracted from a pixel match (e.g., MAX) according to Equation 8 below:

$$InterpolationConfidence(PA_x, PA_y) = \text{MAX} \quad \text{Equation 8}$$

The process then proceeds to step 156.

Alternatively, if the system 100 determines that the disparity map value at the pixel PA is null, then the process proceeds to step 154. In step 154, the system 100 determines and stores missing disparity map and interpolation confidence values for the pixel PA. In particular, the system 100 determines a tentative disparity map value for the pixel PA when the maximum pixel matching confidence value of the best candidate pixel of image B is less than the pixel matching confidence threshold such that the pixel PA can be assigned an interpolation confidence value. It should be understood that the tentative disparity map value can be utilized optionally and can be conditioned to the pixel matching confidence value in successive processes that can operate on the point cloud. The process then proceeds to step 156. In step 156, the system 100 determines whether additional pixels are present in the overlap region R. If the system 100 determines that additional pixels are present in the overlap region R, then the process returns to step 148. Alternatively, if the system 100 determines that additional pixels are not present in the overlap region R, then the process ends.

Figure 9:
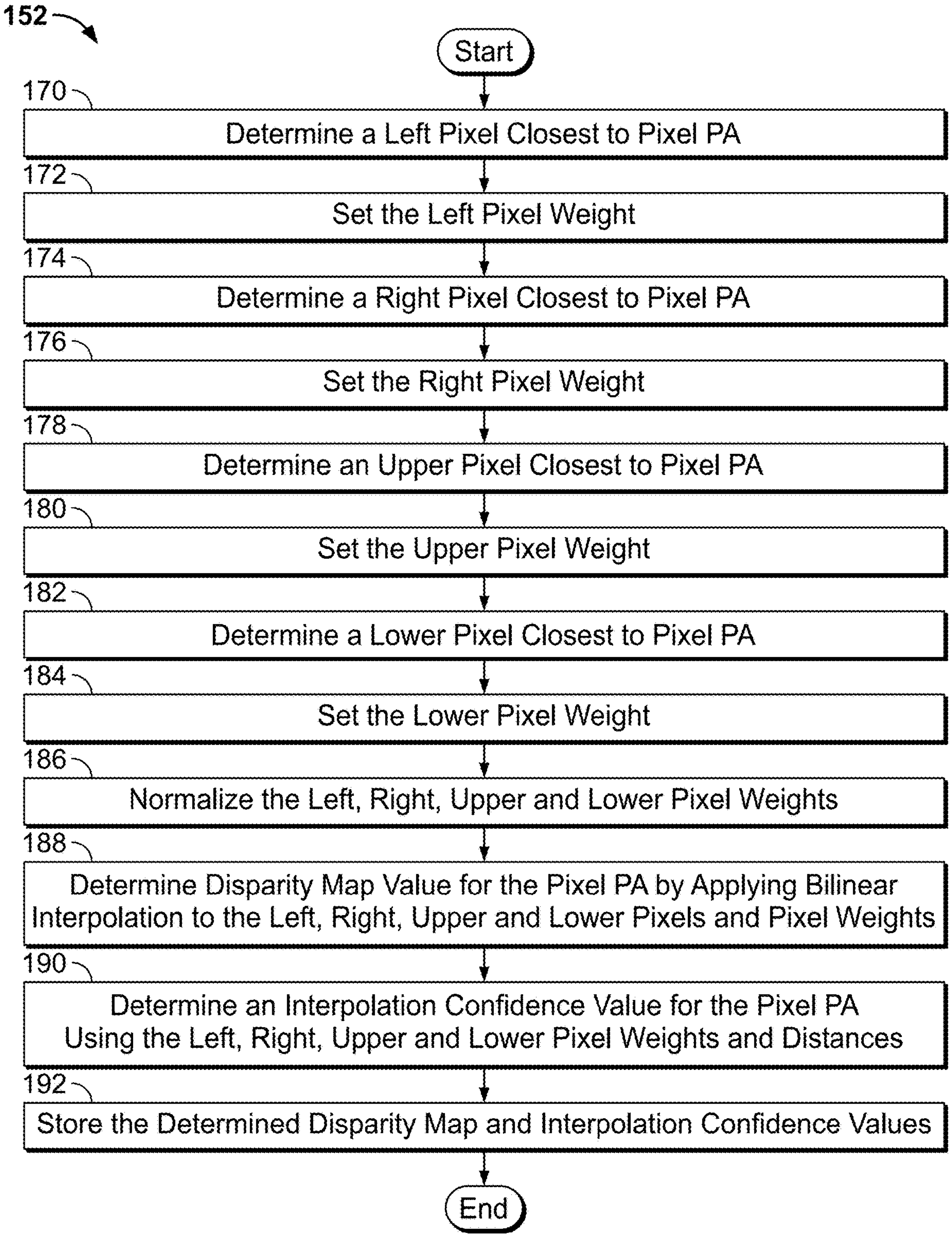
FIG. 9 is a flowchart illustrating step 152 of FIG. 8 in greater detail.

FIG. 9 is a flowchart illustrating step 152 of FIG. 8 in greater detail. In step 170, the system 100 determines a left pixel closest to the pixel PA and, in step 172, the system 100 sets a weight for the left pixel closest to the pixel PA. In step 174, the system 100 determines a right pixel closest to the pixel PA and, in step 176, the system 100 sets a weight for the right pixel closest to the pixel PA. Then, in step 178, the system 100 determines an upper pixel closest to the pixel PA and, in step 180, the system 100 sets a weight for the upper pixel closest to the pixel PA. Next, in step 182, the system 100 determines a lower pixel closest to the pixel PA and, in step 184, the system 100 sets a weight for the lower pixel closest to the pixel PA. In step 186, the system 100 normalizes the left, right, upper and lower pixel weights such that a sum of the weights is equivalent to one. Then, in step 188, the system 100 determines a disparity map value for the pixel PA by applying bilinear interpolation to the left, right, upper and lower pixel weights. Next, in step 190, the system 100 determines an interpolation confidence value for the pixel PA by averaging the left, right, upper, and lower pixel weights and distances. In step 192, the system 100 stores the determined disparity map and interpolation confidence values for the pixel PA.

FIG. 10 is a diagram 200 illustrating an algorithm for determining a disparity map by the system 100 of the present disclosure. In particular, FIG. 10 illustrates an algorithm utilized by the system 100 to determine disparity map and interpolation confidence values for a pixel PA when a disparity map value at the pixel PA is null. As shown in FIG. 10, the algorithm can determine the disparity map value for the pixel PA based on pixels proximate (e.g., left, right, upper and lower) to the pixel PA and respective weights thereof and by utilizing bilinear interpolation. The algorithm can also determine the interpolation confidence value for the pixel PA by averaging the weights and distances of the pixels proximate (e.g., left, right, upper and lower) to the pixel PA.

It should be understood that the algorithm can determine the disparity map and interpolation confidence values for the pixel PA based on other pixels proximate to the pixel PA having different weight factors and can consider other information including, but not limited to, image DisparityMap(P), DepthMap(P), RGB(P) and RealXYZ(P). It should also be understood that the algorithm can determine the disparity map value for the pixel PA by utilizing bicubic interpolation or any other algorithm that estimates a point numerical value based on proximate pixel information having different weight factors including, but not limited to, algorithms based on heuristics, computer vision and machine learning. Additionally, it should be understood that the interpolation confidence value is a fitness function and can be determined by any other function including, but not limited to, functions based on heuristics, computer vision and machine learning.

Figure 11:
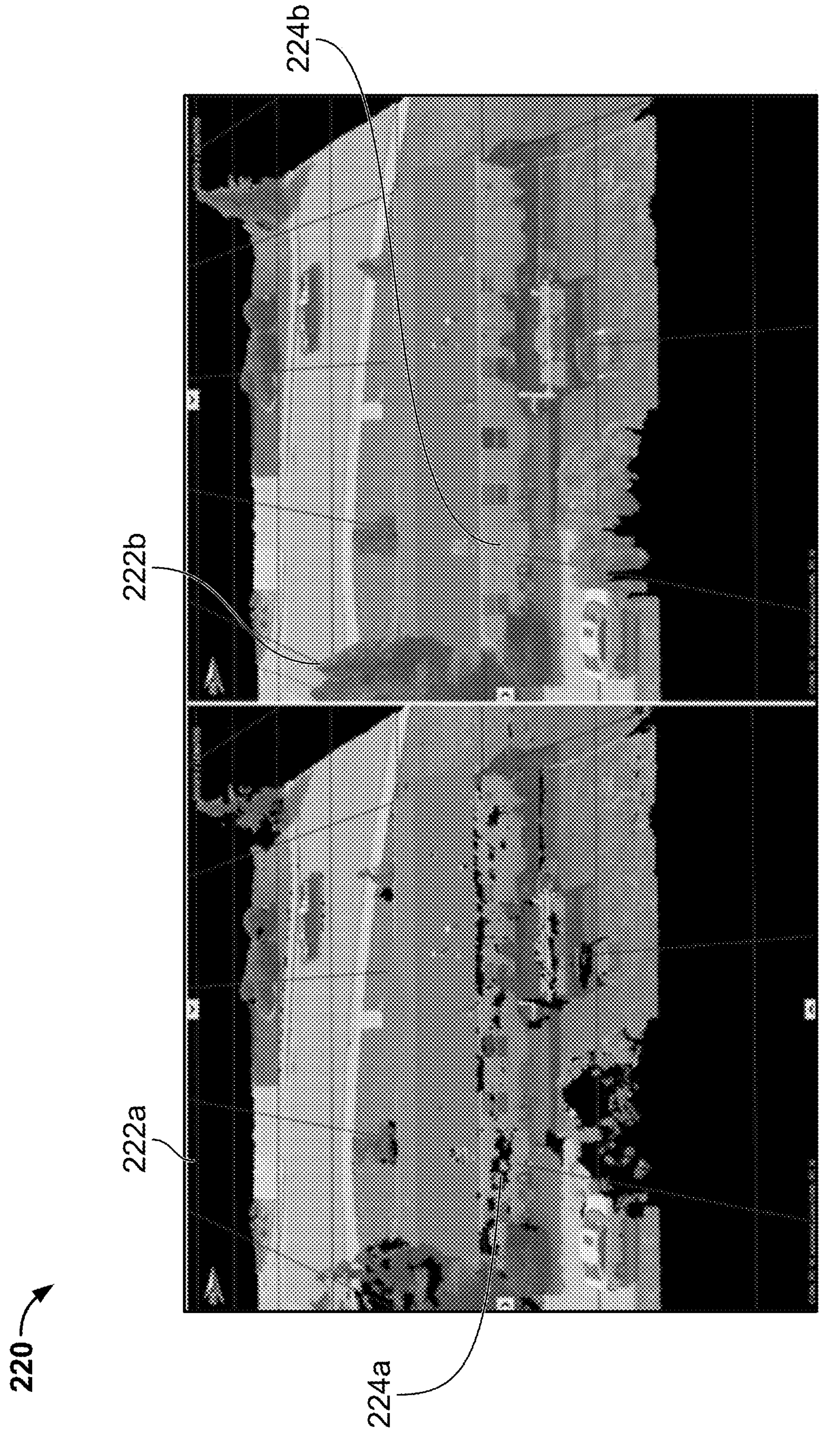
FIGS. 11-13 are diagrams illustrating a comparison of three-dimensional (3D) model images generated by the conventional processing steps and the system of the present disclosure using 3D point clouds derived from stereoscopic image pairs.
Figure 12:
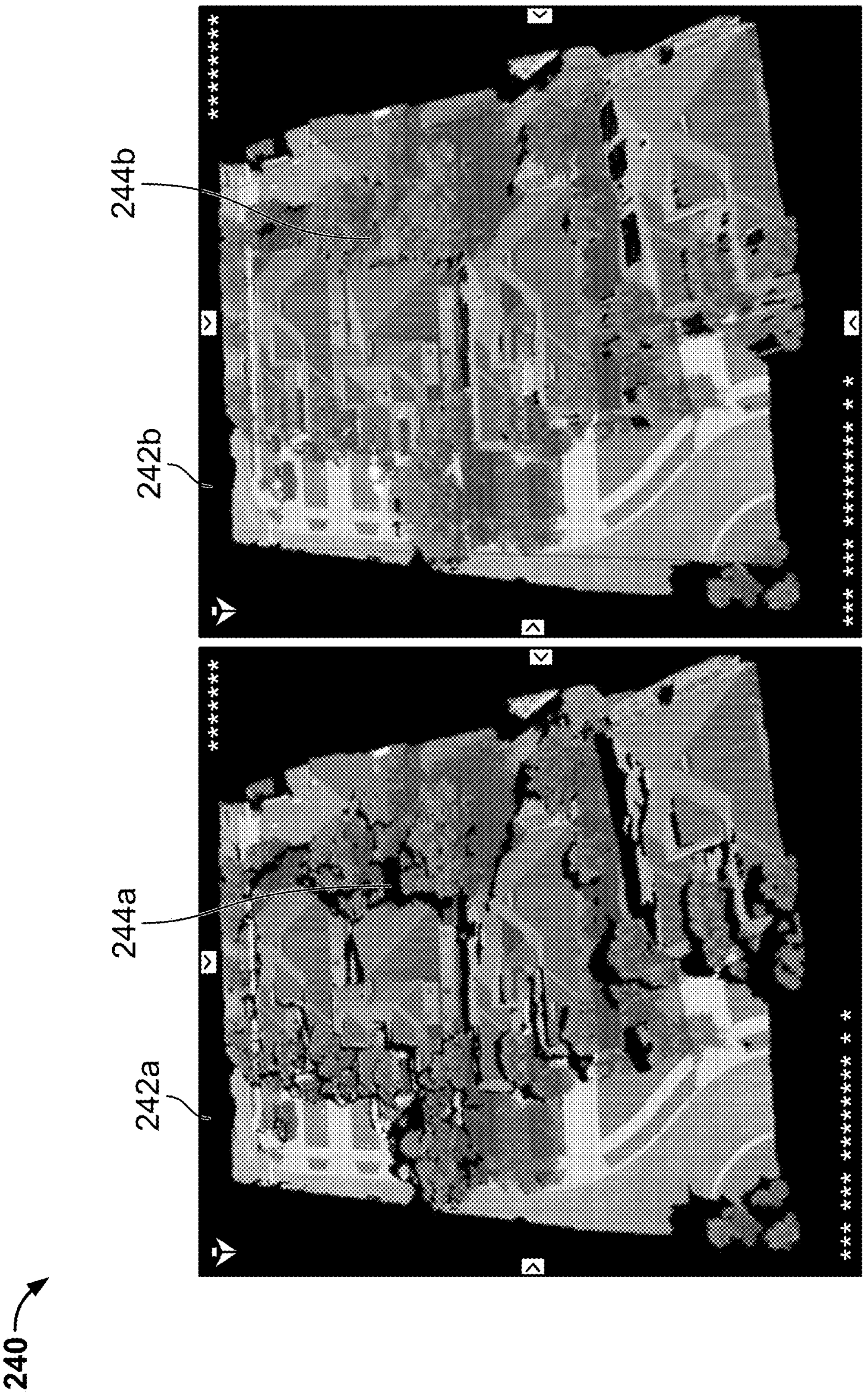
Figure 13:
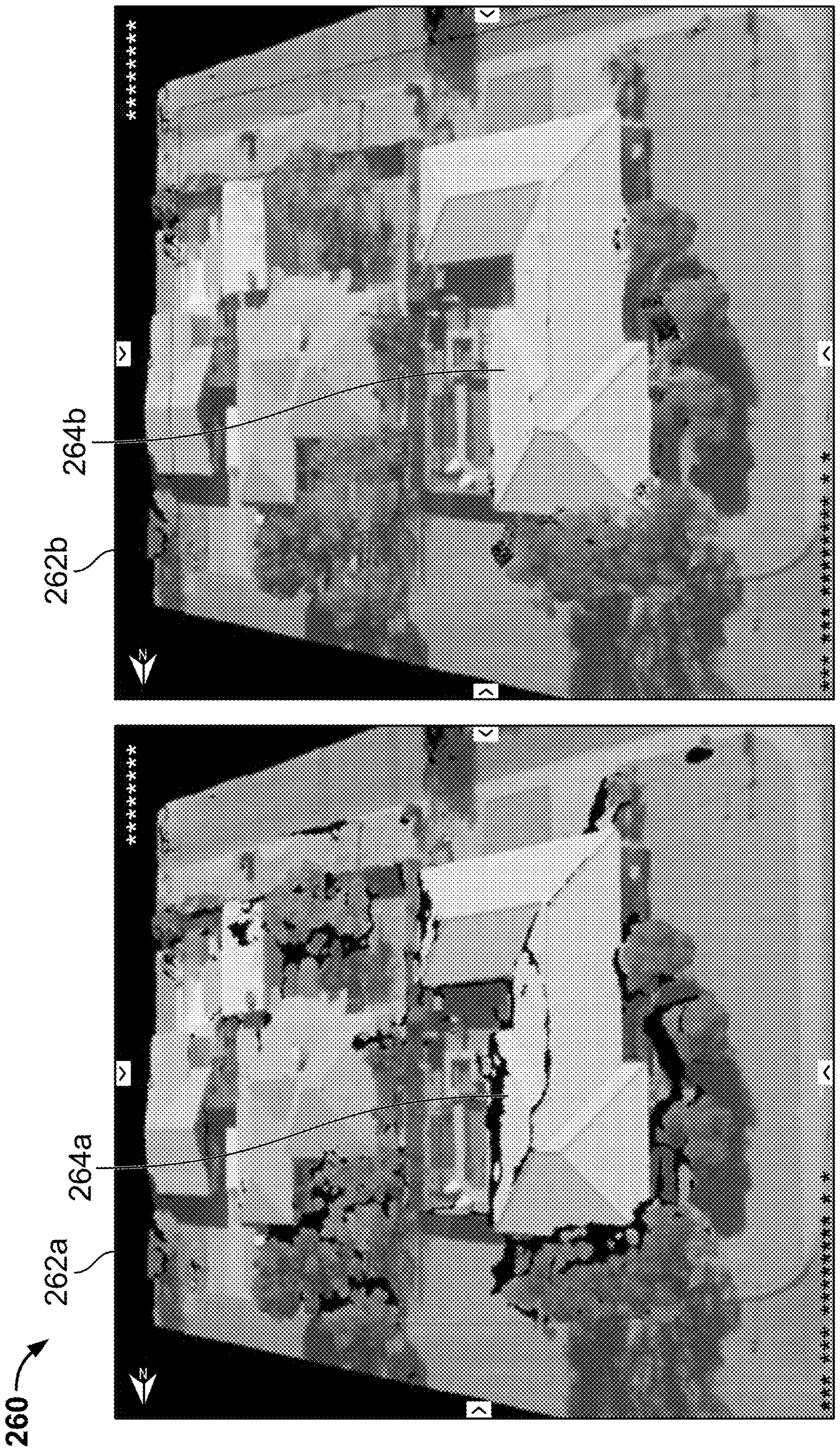

FIGS. 11-13 are diagrams illustrating a comparison of 3D model images generated by conventional processing steps and the system 100 of the present disclosure using 3D point clouds derived from stereoscopic image pairs. FIG. 11 is a diagram 220 illustrating a 3D model image 222*a* generated by the conventional processing steps as described above in relation to FIGS. 1-3 and a 3D model image 222*b* generated by the system 100. As shown in FIG. 11, the image 222*a* is missing several data points 224*a* whereas the image 222*b* includes corresponding data points 224*b*. FIG. 12 is a diagram 240 illustrating a 3D model image 242*a* generated by the processing steps as described above in relation to FIGS. 1-3 and a 3D model image 242*b* generated by the system 100. As shown in FIG. 12, the image 242*a* is missing several data points 244*a* whereas the image 242*b* includes corresponding data points 244*b*. FIG. 13 is a diagram 260 illustrating a 3D model image 262*a* generated by the conventional processing steps as described above in relation to FIGS. 1-3 and a 3D model image 262*b* generated by the system 100. As shown in FIG. 13, the image 262*a* is missing several data points 264*a* whereas the image 262*b* includes corresponding data points 264*b*.

Figure 14:
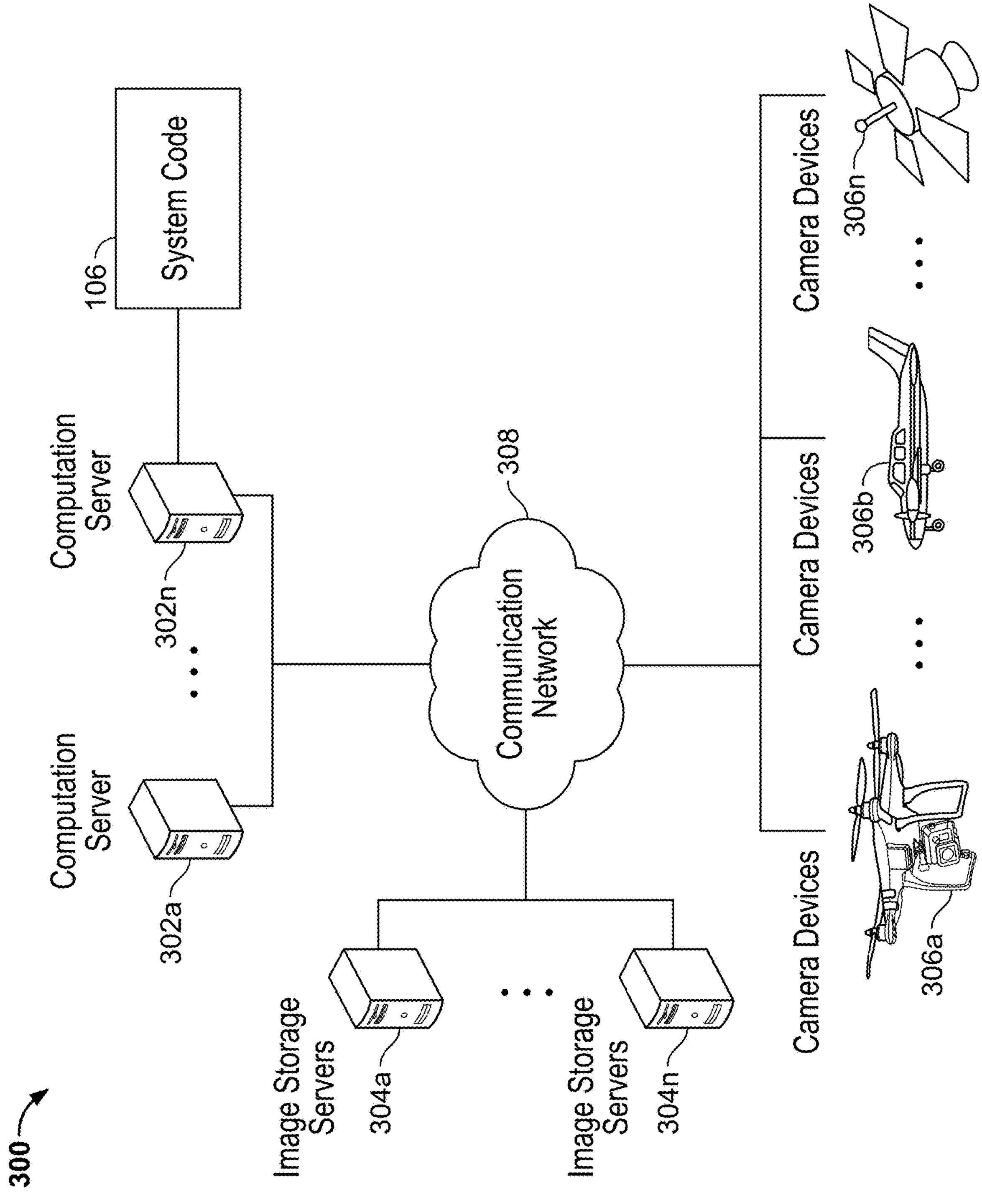
FIG. 14 is a diagram illustrating another embodiment of the system of the present disclosure.

FIG. 14 a diagram illustrating another embodiment of the system 300 of the present disclosure. In particular, FIG. 14 illustrates additional computer hardware and network components on which the system 300 could be implemented. The system 300 can include a plurality of computation servers 302*a*-302*n* having at least one processor and memory for executing the computer instructions and methods described above (which could be embodied as system code 106). The system 300 can also include a plurality of image storage servers 304*a*-304*n* for receiving image data and/or video data. The system 300 can also include a plurality of camera devices 306*a*-306*n* for capturing image data and/or video data. For example, the camera devices can include, but are not limited to, an unmanned aerial vehicle 306*a*, an airplane 306*b*, and a satellite 306*n*. The computation servers 302*a*-302*n*, the image storage servers 304*a*-304*n*, and the camera devices 306*a*-306*n* can communicate over a communication network 308. Of course, the system 300 need not be implemented on multiple devices, and indeed, the system 300 could be implemented on a single computer system (e.g., a personal computer, server, mobile computer, smart phone, etc.) without departing from the spirit or scope of the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A computer vision system for supplying missing point data in point clouds derived from stereoscopic image pairs, comprising:
- a memory storing a plurality of stereoscopic image pairs; and
- a processor in communication with the memory, the processor programmed to perform the steps of:
  - retrieving the at least one stereoscopic image pair from the memory based on a received geospatial region of interest;
  - processing the at least one stereoscopic image pair to generate a disparity map from the at least one stereoscopic image pair, the disparity map generated at least in part by determining a similarity factor value between a first region near a first pixel of a first image of the at least one stereoscopic image pair and a second region near a second pixel of a second image of the at least one stereoscopic image pair;
  - processing the disparity map to identify at least one null value in the disparity map;
  - discarding all matching point pairs of the at least one stereoscopic image pair corresponding to the null value in the disparity map;
  - supplying the disparity map with missing point data to replace the at least one null value of the disparity map when a maximum pixel matching confidence value of a best candidate pixel of an image of the at least one stereoscopic image pair is less than a pixel matching confidence threshold, the missing point data comprising: (1) a replacement disparity map value interpolated from normalized weights set for a plurality of pixels surrounding a pixel in an overlap region of the at least one stereoscopic image pair; and (2) an interpolated confidence value for the pixel in the overlap region;
  - processing the disparity map to generate a depth map from the disparity map;
  - processing the depth map to generate a point cloud from the depth map, the point cloud lacking any missing point data; and
  - storing the point cloud.

2. The system of claim 1, wherein the step of processing the at least one stereoscopic image pair comprises determining the overlap region between first and second images of the at least one stereoscopic image pair.

3. The system of claim 2, further comprising generating the disparity map by iterating over pixels of the first image within the overlap region.

4. The system of claim 3, further comprising determining a projection of a pixel on the second image based on a terrain height.

5. The system of claim 4, further comprising determining each pixel of the second image that corresponds to the pixel protected into the second image.

6. The system of claim 5, further comprising determining the pixel matching confidence value using at least one pixel matching algorithm for each pixel of the second image corresponding to the pixel projected onto the second image.

7. The system of claim 6, further comprising determining a best candidate pixel of the second image corresponding to the pixel projected to the second image that maximizes the pixel confidence value.

8. The system of claim 7, further comprising determining if the pixel matching confidence value of the best candidate pixel exceeds a pre-defined threshold.

9. The system of claim 8, further comprising setting a disparity map value of the pixel projected onto the second image as a null value if the pixel matching confidence value of the best candidate pixel does not exceed the pre-defined threshold.

10. The system of claim 8, further comprising generating a disparity map at the pixel projected onto the second image based on a distance between the best candidate pixel and the pixel projected onto the second image if the pixel confidence value of the best candidate pixel exceeds the pre-defined threshold.

11. The system of claim 2, further comprising generating the disparity map by iterating over all pixels of the first image within the overlap region.

12. The system of claim 11, further comprising identifying a pixel in the overlap region and determining whether a disparity map value at the pixel is null.

13. The system of claim 12, further comprising determining and storing missing disparity map and interpolation confidence data for the pixel within the overlap region if the disparity map value of the pixel is null.

14. The system of claim 12, further comprising assigning and storing interpolation confidence data for the pixel in the overlap region if the disparity map value of the pixel is not null.

15. The system of claim 14, wherein the step of assigning and storing the interpolation confidence data for the pixel in the overlap region comprises determining left, right, upper, and lower pixels closest to the pixel in the overlap region and setting left, right, upper, and lower pixel weights.

16. The system of claim 15, further comprising normalizing the left, right, upper, and lower pixel weights.

17. The system of claim 16, further comprising determining a disparity value for the pixel in the overlap region by applying bilinear interpolation to the left, right, upper, and lower pixel weights.

18. The system of claim 17, further comprising determining an interpolation confidence value for the pixel in the overlap region using the left, upper, and lower pixel weights and at least one distance.

19. The system of claim 18, further comprising storing the determined disparity map 19 and interpolation confidence values.

20. A computer vision method for supplying missing point data in point clouds derived from stereoscopic image pairs, comprising the steps of:
- retrieving by a processor at least one stereoscopic image pair stored in a memory based on a received geospatial region of interest;
- processing the at least one stereoscopic image pair to generate a disparity map from the at least one stereoscopic image pair, the disparity map generated at least in part by determining a similarity factor value between a first region near a first pixel of a first image of the at least one stereoscopic image pair and a second region near a second pixel of a second image of the at least one stereoscopic image pair;
- processing the disparity map to identify at least one null value in the disparity map;

discarding all matching point pairs of the at least one stereoscopic image pair corresponding to the null value in the disparity map;

supplying the disparity map with missing point data to replace the at least one null value of the disparity map when a maximum pixel matching confidence value of a best candidate pixel of an image of the at least one stereoscopic image pair is less than a pixel matching confidence threshold, the missing point data comprising: (1) a replacement disparity map value interpolated from normalized weights set for a plurality of pixels surrounding a pixel in an overlap region of the at least one stereoscopic image pair; and (2) an interpolated confidence value for the pixel in the overlap region;

processing the disparity map to generate a depth map from the disparity map;

processing the depth map to generate a point cloud from the depth map, the point cloud lacking any missing point data; and storing the point cloud.

21. The method of claim 20, wherein the step of processing the at least one stereoscopic image pair comprises determining the overlap region between first and second images of the at least one stereoscopic image pair.

22. The method of claim 21, further comprising generating the disparity map by iterating over pixels of the first image within the overlap region.

23. The method of claim 22, further comprising determining a projection of a pixel on the second image based on a terrain height.

24. The method of claim 23, further comprising determining each pixel of the second image that corresponds to the pixel protected into the second image.

25. The method of claim 24, further comprising determining the pixel matching confidence value using at least one pixel matching algorithm for each pixel of the second image corresponding to the pixel projected onto the second image.

26. The method of claim 25, further comprising determining a best candidate pixel of the second image corresponding to the pixel projected to the second image that maximizes the pixel confidence value.

27. The method of claim 26, further comprising determining if the pixel matching confidence value of the best candidate pixel exceeds a pre-defined threshold.

28. The method of claim 27, further comprising setting a disparity map value of the pixel projected onto the second image as a null value if the pixel matching confidence value of the best candidate pixel does not exceed the pre-defined threshold.

29. The method of claim 27, further comprising generating a disparity map at the pixel projected onto the second image based on a distance between the best candidate pixel and the pixel projected onto the second image if the pixel confidence value of the best candidate pixel exceeds the pre-defined threshold.

30. The method of claim 21, further comprising generating the disparity map by iterating over all pixels of the first image within the overlap region.

31. The method of claim 30, further comprising identifying a pixel in the overlap region and determining whether a disparity map value at the pixel is null.

32. The method of claim 31, further comprising determining and storing missing disparity map and interpolation confidence data for the pixel within the overlap region if the disparity map value of the pixel is null.

33. The method of claim 31, further comprising assigning and storing interpolation confidence data for the pixel in the overlap region if the disparity map value of the pixel is not null.

34. The method of claim 33, wherein the step of assigning and storing the interpolation confidence data for the pixel in the overlap region comprises determining left, right, upper, and lower pixels closest to the pixel in the overlap region and setting left, right, upper, and lower pixel weights.

35. The method of claim 34, further comprising normalizing the left, right, upper, and lower pixel weights.

36. The method of claim 35, further comprising determining a disparity value for the pixel in the overlap region by applying bilinear interpolation to the left, right, upper, and lower pixel weights.

37. The method of claim 36, further comprising determining an interpolation confidence value for the pixel in the overlap region using the left, upper, and lower pixel weights and at least one distance.

38. The method of claim 37, further comprising storing the determined disparity map and interpolation confidence values.

* * * * *